United States Patent [19]
Fukui et al.

[11] Patent Number: 5,233,961
[45] Date of Patent: Aug. 10, 1993

[54] CONTROL APPARATUS FOR AN INTERNAL COMBUSTION ENGINE

[75] Inventors: Wataru Fukui; Atsuko Hashimoto, both of Himeji, Japan

[73] Assignee: Mitsubishi Denki Kabushiki Kaisha, Tokyo, Japan

[21] Appl. No.: 983,971

[22] Filed: Dec. 1, 1992

[30] Foreign Application Priority Data

Dec. 4, 1991 [JP] Japan ................................ 3-320635
Dec. 4, 1991 [JP] Japan ................................ 3-320636

[51] Int. Cl.$^5$ .............................................. F02P 5/06
[52] U.S. Cl. .............................................. 123/419
[58] Field of Search ............... 123/419, 422, 423, 425, 123/435, 609; 364/431.08, 431.04

[56] References Cited

U.S. PATENT DOCUMENTS

| | | | |
|---|---|---|---|
| 4,575,800 | 3/1986 | Kittleson | 364/431.05 |
| 4,951,630 | 8/1990 | Iwata | 123/435 |
| 5,007,397 | 0/1991 | Akasu | 123/422 |
| 5,168,853 | 12/1992 | Kittleson et al. | 123/419 |
| 5,190,011 | 3/1983 | Hashimoto et al. | 123/425 |

*Primary Examiner*—Raymond A. Nelli
*Attorney, Agent, or Firm*—Sughrue, Mion, Zinn, Macpeak and Seas

[57] ABSTRACT

A control apparatus for an internal combustion engine includes a reference position sensor which generates a reference position signal indicating occurrence of a first and a second reference position of each piston of an engine. Using the reference position signal, the period between two occurrences of one of the reference position and the separation between an occurrence of the first reference position and an occurrence of the second reference position are measured. An error in the reference position signal with respect to the first or the second reference position is calculated based on a ratio of the reference position separation to the measured period. A control timing for the engine, such as the ignition timing, is calculated based on operating conditions of the engine, and a control period corresponding to the length of time from an occurrence of one of the reference positions until an occurrence of the control timing is calculated based on the calculated error. The calculation of the control period compensates for the presence of error in the reference position signal, so the engine timing can be accurately controlled despite the presence of error.

17 Claims, 5 Drawing Sheets

CONTROL APPARATUS FOR AN INTERNAL COMBUSTION ENGINE

BACKGROUND OF THE INVENTION

This invention relates to a control apparatus for an internal combustion engine which controls the timing of some feature of engine operation, such as the ignition or fuel injection timing. More particularly, it relates to a control apparatus which can prevent the engine timing from being affected by errors in detection of the crankshaft position of the engine.

An internal combustion engine is generally equipped with a reference position sensor which senses each time a piston of any cylinder of the engine is at a predetermined reference position. The time at which ignition or fuel injection is to take place in each cylinder is measured from these reference positions.

A reference position sensor is typically a device which senses rotation of some member which rotates in synchrony with the engine, such as the crankshaft or camshaft of the engine or the rotor of a distributor for the engine. Due to the limits of manufacturing precision and the inherent limitations on the sensing ability of reference position sensors, the reference positions can only be sensed with an accuracy of ±2° of crankshaft rotation. Since the engine timing, such as the ignition timing, is measured from the occurrence of the reference positions as sensed by the reference position sensor, the engine timing may be off by as much as 2° from the correct timing due to sensing error. For example, if the correct ignition timing is 10° BTDC (before top dead center) and the sensing of the reference positions is off by 2°, the ignition may actually take place as early as 12° BTDC or as late as 8° BTDC.

When the ignition timing of an engine is the ideal value, the output torque of the engine is a maximum. However, when the ignition timing is only 1° different from the ideal value, the output torque falls by about 1 horsepower. Accordingly, an error component of ±2° in the engine timing is far from negligible, and can produce a significant decrease in horsepower. Furthermore, if the ignition timing deviates from the ideal value and an excessive advance angle or abnormal lag angle develops, problems such as engine knocking or insufficient engine output may develop.

SUMMARY OF THE INVENTION

Accordingly, it is an object of the present invention to provide a control apparatus for an internal combustion engine which can compensate for errors in detection of reference positions of the engine and control the engine timing with high accuracy.

It is another object of the present invention to provide a control method for an internal combustion engine which can compensate for such errors.

In a control apparatus for an internal combustion engine according to the present invention, a reference position sensor generates a reference position signal for indicating occurrence of a first and a second reference position of a piston of the engine. A period determining means determines the period between two indications by the reference position signal of an occurrence of one of the references positions and a reference position separation between an indication by the reference position signal of an occurrence of the first reference position and an indication by the reference position signal of an occurrence of the second reference position. An error calculating means calculates an error in the reference position signal with respect to the first or the second reference position based on a ratio of the reference position separation to the measured period. A timing setting means calculates a control timing indicating a piston position at which a control operation for the engine is to take place, and it also calculates a control period corresponding to the length of time from an indication by the reference position signal of an occurrence of one of the reference positions until an occurrence of the control timing based on the error.

In preferred embodiments, the occurrence of one of the reference position is indicated by a change in the level of the reference position signal. For example, the reference position signal may comprise pulses each having a rising edge indicating the first reference position and a falling edge indicating the second reference position.

The timing setting means sets the control period to the length of time from an occurrence of one of the reference positions until the occurrence of the control timing adjusted by a correction factor based on the calculated error. When the calculated error is zero, the rising and falling edges of the reference position signal will exactly coincide with the reference positions and the correction factor will be zero. On the other hand, when the calculated error is non-zero, the correction factor will likewise be non-zero, and the control period will be suitably adjusted by the correction factor so that the control operation will take place at the calculated control timing, regardless of the presence of the error in the reference position signal.

DESCRIPTION OF PREFERRED EMBODIMENTS

Figure 1:
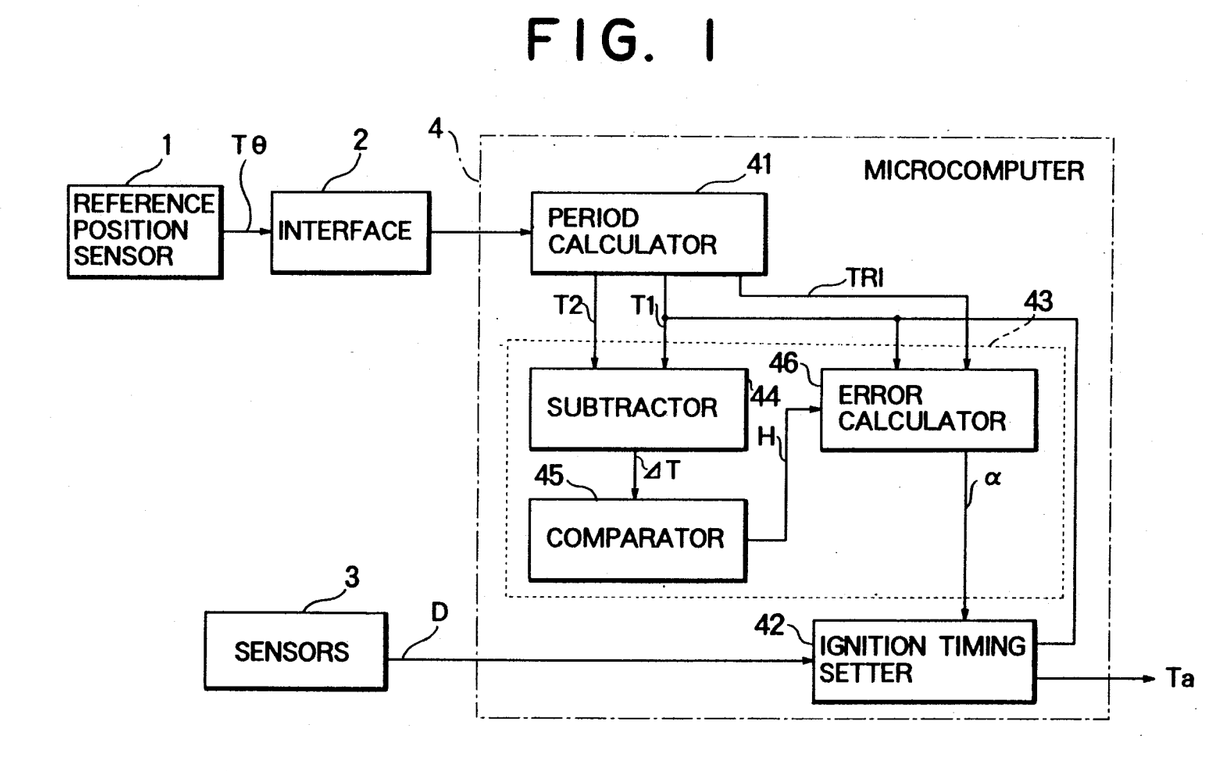
FIG. 1 is a block diagram of an embodiment of a control apparatus according to the present invention.

A number of preferred embodiments of the present invention will now be described while referring to the accompanying drawings. FIG. 1 schematically illustrates a first embodiment as applied to an unillustrated multi-cylinder internal combustion engine, such as an engine mounted on an automobile or other vehicle. This embodiment will be described with respect to a four-cylinder, four-cycle engine, but the number of cylinders in the engine is not important.

Figure 2:
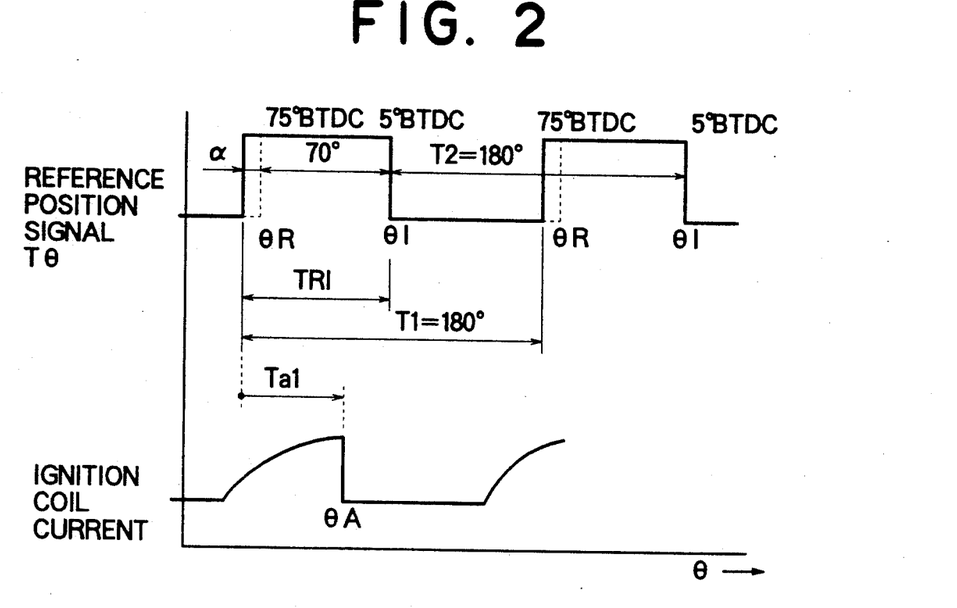
FIG. 2 is a wave form diagram illustrating the operation of the embodiment of FIG. 1 at high engine speeds.
Figure 3:
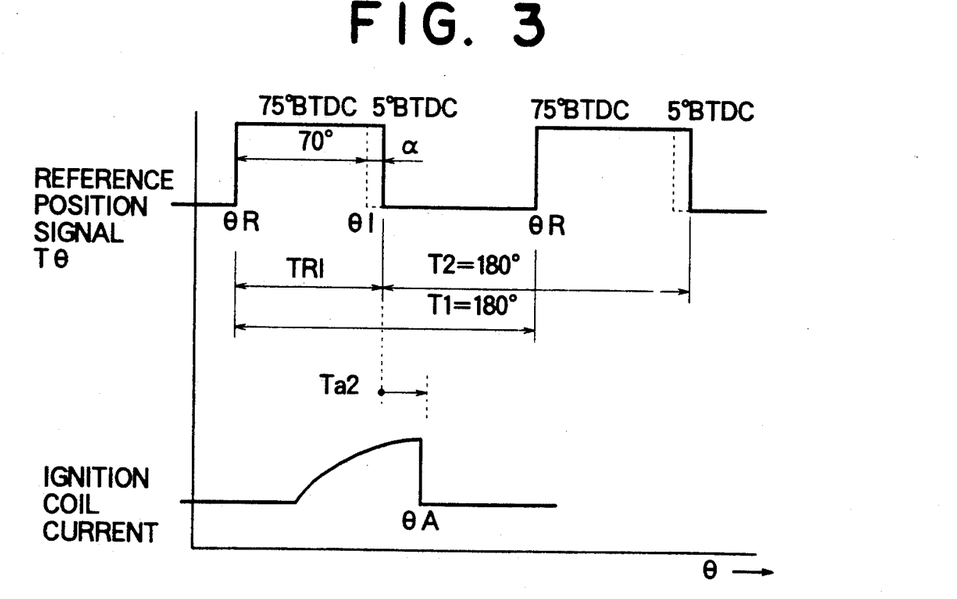
FIG. 3 is a wave form diagram illustrating the operation of the embodiment of FIG. 1 at low engine speeds.

This embodiment includes a conventional reference position sensor 1 which senses the rotation of some member rotating in synchrony with the engine and generates an electrical output signal, referred to as a reference position signal $T\theta$, indicating each time a piston of the engine is at a prescribed reference position. An example of the reference position sensor 1 is a conventional crankshaft position sensor which senses by magnetic or optical means the rotation of a disk driven by the crankshaft. In this embodiment, as shown in FIGS. 2 and 3, the reference position signal $T\theta$ comprises pulses having a rising edge corresponding to a first reference position $\theta R$ and a falling edge corresponding to a second reference position $\theta I$. The reference positions are not restricted to any particular crankshaft angles, but in the present embodiment, the first reference position $\theta R$ corresponds to a piston position of 75° BTDC and the second reference position $\theta I$ corresponds to a piston position of 5° BTDC for each cylinder of the engine.

The period between consecutive occurrences of the first reference position $\theta R$ is referred to as T1, and the period between consecutive occurrences of the second reference position $\theta I$ is referred to as T2. The time between occurrence of the first and second references position $\theta R$ and $\theta I$ for a single cylinder, i.e., the pulse width of the reference position signal $T\theta$ will be referred to as the reference position separation and denoted by TRI. In the present embodiment, TRI corresponds to 70° of crankshaft rotation. In a four-cylinder engine, T1 and T2 both correspond to 180° of crankshaft rotation. For a single cylinder, the period between consecutive occurrences of the first or the second reference position corresponds to 720° of crankshaft rotation.

The reference position signal $T\theta$ is input from the reference position sensor 1 to a controller in the form of a microcomputer 4 through an interface 2. The microcomputer 4 also receives input signals from one or more operating condition sensors 3 which detect on or more operating conditions D of the engine. Based on the reference position signal $T\theta$ and the operating conditions D, the microcomputer 4 calculates a control timing, such as the ignition timing or the fuel injection timing, for each cylinder of the engine.

In FIG. 1, the microcomputer 4 is illustrated as comprising a plurality of units represented by the individual blocks in the figure. However, this is merely a conceptual representation, and the functions of these blocks may be performed by a program executed by the microcomputer 4. The microcomputer 4 includes a period calculator 41 which receives the reference position signal $T\theta$ and calculates periods T1 and T2 and reference position separation TRI by measuring the time between occurrences of the reference positions indicated by the reference position signal $T\theta$ and generates corresponding output signals.

An error calculating unit 43 determines the magnitude of an error $\alpha$ in the reference position signal $T\theta$ with respect to the first or second reference position. A signal indicating the error $\alpha$ is provided to an ignition timing setter 42. The ignition timing setter 42 calculates an ignition timing $\theta A$ based on the operating conditions D and the first period T1. Based on the error $\alpha$, the ignition timing setter 42 sets a control period Ta for ignition which compensates for the presence of the error $\alpha$ in the reference position signal $T\theta$. Ta indicates the length of time between the occurrence of one of the reference positions $\theta R$, $\theta I$ until the occurrence of the ignition timing $\theta A$. An output signal indicating the value of Ta is provided to an unillustrated ignition controller, which controls an ignition coil which provides an ignition current to an unillustrated spark plug when the control period Ta elapses.

When the ignition timing $\theta A$ is prior to the second reference position $\theta I$, such as at high engine speeds, the control period Ta is measured from the first reference position $\theta R$ and will be referred to as Ta1. Conversely, when the ignition timing $\theta A$ is later than the second reference position $\theta I$, such as a low engine speeds, the control period Ta is measured from the second reference position $\theta I$ and will be referred to as Ta2.

The error calculating unit 43 includes a subtractor 44 which calculates the time difference $\Delta T$ between the lengths of periods T1 and T2 calculated by the period calculator 41. A comparator 45 receives a signal from the subtractor 44 indicating the time difference $\Delta T$ and generates an output signal H indicating a steady engine operating state when the difference $\Delta T$ is less than or equal to a prescribed value $\gamma$. When the comparator 45 generates the output signal H, an error calculator 46 calculates the error $\alpha$, expressed in degrees of crankshaft rotation, of the first or second reference position indicated by the reference position signal $T\theta$ based on the ratio of period T1 and the reference position separation TRI.

The subtractor 44 and the comparator 45 together comprise operating condition determining means for determining when the engine is in a steady operating state in which the engine rotational speed is steady.

FIGS. 2 and 3 illustrate the wave forms of the reference position signal $T\theta$ and the current flowing through the primary winding of an unillustrated ignition coil for the engine. In these figures, the abscissa is crankshaft angle $\theta$, while the ordinate is the magnitude of the signal being measured.

FIG. 2 shows the case in which the timing of the falling edge of the reference position signal $T\theta$ is presumed to be correct and the timing of the rising edge of the reference position signal $T\theta$ contains an error. In other words, it is assumed that the falling edge of the reference position signal $T\theta$ occurs at the second reference position $\theta I$ (5° BTDC), but that the rising edge of the reference position signal $T\theta$ is deviated from the first reference position $\theta R$ (75° BTDC) by an error $\alpha$. In FIG. 2, the actual rising edge of each pulse of the reference position signal $T\theta$ is shown with a solid line, while the dashed line indicates the timing of the rising edge in the absence of an error $\alpha$. The error c is thus the number of degrees of crankshaft rotation between the solid line and the dashed line.

FIG. 3 shows the case in which the timing of the rising edge of the reference position signal $T\theta$ is presumed to be correct and the timing of the falling edge of the reference position signal $T\theta$ contains an error. In other words, it is assumed that the rising edge of the reference position signal $T\theta$ occurs at the first reference position $\theta R$ (75° BTDC), but that the falling edge of the reference position signal $T\theta$ is deviated from the second reference position $\theta I$ (5° BTDC) by an error $\alpha$. In FIG. 3, the dashed lines indicate the timing of the falling edges of the reference position signal $T\theta$ in the absence of an error $\alpha$.

Figure 4:
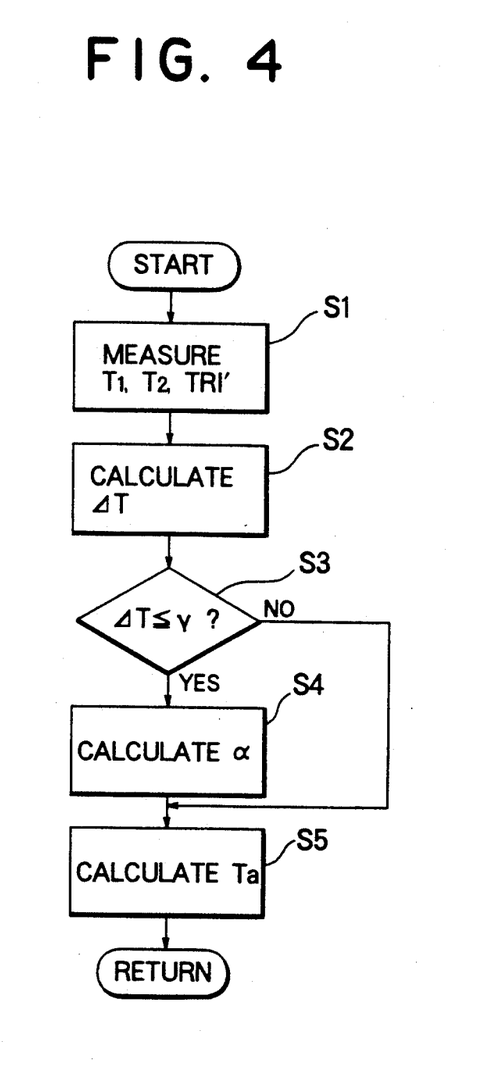
FIG. 4 is a flow chart illustrating the operation of the embodiment of FIG. 1

The operation of the embodiment illustrated in FIG. 1 will now be described while referring to FIG. 4, which is a flow chart of a routine performed by the microcomputer 4.

The reference position signal $T\theta$ is input to the microcomputer 4 through the interface 2, and in Step S10 the period calculator 51 calculates period TI and the reference position separation TRI. As shown in FIGS. 2 and 3, the reference position separation TRI includes an error $\alpha$.

In Step S2, the operating condition determining means comprising the subtractor 44 and the comparator 45 determine whether the engine is operating in a steady operating state. Namely, the subtractor 44 calculates the time difference ΔT equal to the absolute value of the difference between periods T1 and T2, and the comparator 45 compares the difference ΔT with a predetermined value γ. γ can be selected to correspond to 2°–3° of crankshaft rotation, for example, which is the range of the error α in the reference position signal Tθ.

It ΔT ≦ γ, the engine operating state is determined to be steady, so the comparator 45 generates signal H. In Step S4, in response to signal H, the error calculator 46 calculates the error α from the following formula using the ratio of the reference position separation TRI and period T1:

$$\alpha = (TRI/T1) \times 180° - 70° \quad (1)$$
$$= [TRI \times (180°/70°) - T1] \times (70°/T1)$$

wherein 180° is the number of degrees of crankshaft rotation in period T1 and 70° is the number of degrees of crankshaft rotation between the first and second reference positions.

Since T1 is generally a very small quantity, its presence in the denominator of the right side of Equation (1) means that small errors in the measurement of T1 can result in quite large errors in the value of α calculated by Equation (1). Such large errors can be reduced by taking advantage of the fact that T1 is inversely proportional to the engine rotational speed. For example, the signals generated by the operating condition sensor 3 may include rotational speed information Ne indicating the engine rotational speed. Ne is proportional to the rotational speed and has a value of 256, for example, when the engine rotational speed is 2000 rpm. In this case, it can be easily shown that $$Ne = (30 \times 10^6/T1) \times 256/2000 \quad (2)$$

Therefore, $$70°/T1 = Ne \times (1/256) \times (1/214) \quad (3)$$

Substituting Equation (3) into Equation (1) gives $$\alpha = [TRI \times (180°/70°) - T1] \times Ne \times (1/256) \times (1/214) \quad (4)$$

The value of (1/256)×(1/214) can be stored in the microcomputer 4 in advance. As Ne is a relatively large value, small errors in the measurement of Ne have much less effect on the value of α than do small error in the measurement of T1 in Equation (4). Furthermore, since Equation (4) entails multiplication rather than division, it can be calculated more efficiently and rapidly by the microcomputer 4 than can Equation (1).

A signal indicating the calculated error α is input to the ignition timing setter 42, which in Step S5 calculates the ignition timing θA based on the operating conditions D and period T1 or T2, and it also calculates the control period Ta so as to compensate for the error α in the reference position signal Tθ.

In the case shown in FIG. 2 in which the error α is assumed to be with respect to the first reference position θR, when the ignition timing Tθ is prior to the second reference position θI, the control period Ta is a period Ta1 measured from the first reference position θR. Therefore, the control period Ta1 is calculated by the following equation:

$$Ta1 = (\theta R + \alpha - \theta A) \cdot T1/180° \quad (5)$$

In this equation, (θR−θA)·T1/180° is the value of Ta1 in the absence of an error α in the reference position signal Tθ, and the term α·T1/180° is a correction factor which compensates for the existence of the error α.

A signal indicating the calculated control period Ta1 is provided to the unillustrated ignition controller. At a high engine rotational speed at which the ignition timing θA is earlier than the second reference position θI, the ignition controller measures the elapse of time from the rising edge of the reference position signal Tθ, and when the control period Ta1 has elapsed, it cuts off the primary current in the ignition coil. The resulting current generated in the secondary winding of the ignition coil causes the spark plug for the cylinder for which the control period Ta was calculated to fire.

Because the calculation of the control period Ta1 takes the existence of the error o into consideration, ignition will take place at the correct crankshaft angle, i.e., at the ignition timing θA. As a result, problems such as knocking due to an excessive advance angle or lag angle can be prevented, and the engine power can be maximized. Furthermore, problems such as knocking due to an excessive advance angle or abnormal lag angle can be prevented.

At a low engine speed at which the ignition timing θA is later than the second reference position θI, the control period Ta will be a period Ta2 which is measured from the second reference position θI rather than from the first reference position θR. As the falling edge of the reference position signal θI is assumed to accurately indicate the second reference position θI, it is not necessary to correct the control period Ta2 for the error α. Accordingly, Ta2 is calculated from the formula $$Ta2 = (\theta R - 70° - \theta A) \cdot T1/180° \quad (6)$$
$$= (\theta I - \theta A) \cdot T1/180°$$

In the case shown in FIG. 3 in which the error α in the reference position signal Tθ is assumed to be with respect to the second reference position θI, when the ignition timing Tθ is later than the second reference position θI, the control period Ta2 is calculated from the following equation:

$$Ta2 = (\theta R - 70° - \alpha - \theta A) \cdot T1/180° \quad (7)$$
$$= (\theta I - \alpha - \theta A) \cdot T1/180°$$

In this equation, (θI−θA)·T1/180° is the value of Ta2 in the absence of an error α in the reference position signal Tθ, and the term α·T1/180° is a correction factor which compensates for the existence of the error α.

Thus, in the same manner as described with respect to FIG. 2, the calculation of the control period Ta2 compensates for the presence of the error α in the reference position signal Tθ, so ignition will still take place at the correct ignition timing θA and the engine power can be maximized.

At a high engine speed at which the ignition timing θA is earlier than the second reference position θI, the control period Ta will be a period Ta1 which is measured from the first reference position θR rather than from the second reference position θI. As the rising edge of the reference position signal θT is assumed to accurately indicate the first reference position $\theta R$, even if the reference position signal $T\theta$ contains an error with respect to the second reference position $\theta I$, it is not necessary to correct the control period Ta1 for the error $\alpha$. Therefore, the control period Ta1 is calculated from the following equation:

$$Ta1 = (\theta R - \theta A) \cdot T1/180° \qquad (8)$$

In Step S3, if $\Delta T$ is greater than $\gamma$, the engine operating state is determined to be unsteady, so the routine proceeds to Step S5 and the control period Ta is calculated either by assuming that the error $\alpha$ is zero or by using the error $\alpha$ determined in a previous pass through the routine. As a result, when the engine rotational speed is unsteady, an error $\alpha$ of low reliability is not calculated.

Equations (5)–(8) give the values of Ta for a four-cycle, four-cylinder engine. When the present invention is applied to an engine with a different number of cylinders, the number of degrees of crankshaft rotation corresponding to T1 or T2 may change. In general, T1 and T2 correspond to 720°/n degrees of crankshaft rotation, wherein n is the number of cylinders. For example, in a six-cylinder engine, T1 and T2 correspond to 720°/6 = 120° of crankshaft rotation. Therefore, in an engine having other than four cylinders, the constant 80° in Equations (5)–(8) will be replaced by 720°/n. Furthermore, if there are other than 70° of crankshaft rotation between the first and second reference positions, the constant 70° in these equations will be replaced with the suitable number of degrees.

In the embodiment of FIG. 1, the control period Ta calculated by the microcomputer 4 is for use in controlling ignition. However, the microcomputer 4 can be adapted to calculate a different control period for the engine, such as the fuel injection timing.

Figure 5:
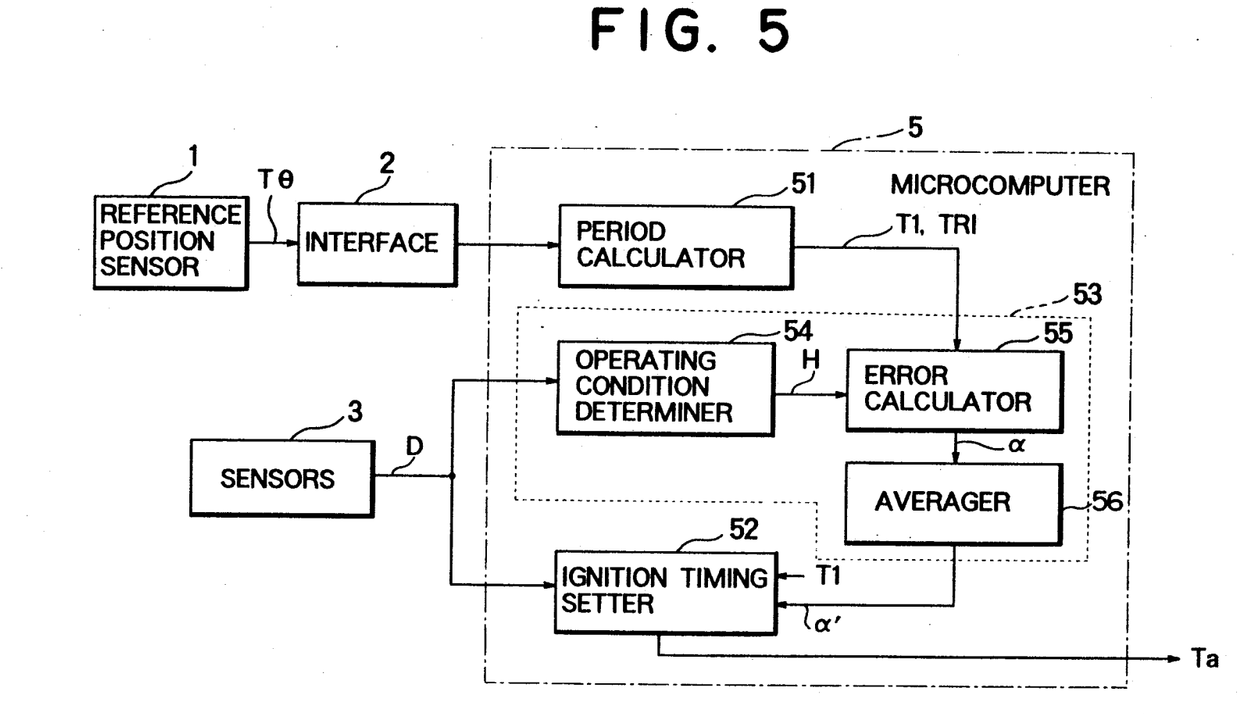
FIG. 5 is a block diagram of another embodiment of the present invention.

FIG. 5 schematically illustrates another embodiment of the present invention. The overall structure of this embodiment is similar to that of the previous embodiment, and like that embodiment it includes a reference position sensor 1 that generates a reference position signal $T\theta$, an interface 2 connected to the reference position sensor 1, one or more sensors 3 which generate output signals indicating one or more operating conditions D of the engine of the vehicle, and a controller in the form of a microcomputer 5 connected to the interface 2 and the sensors 3. The microcomputer 5 is conceptually illustrated as including elements 51–56, although the functions of these elements can be performed by a program executed by the microcomputer 5. A period calculator 51 in the microcomputer 5 calculates the period T1 and the reference position separation TRI by measuring the time between occurrences of the reference positions indicated by the reference position signal $T\theta$ and generates corresponding output signals.

An error calculating unit 53 determines the magnitude of the error $\alpha$ in the reference position signal $T\theta$ and then calculates an average $\alpha'$ of the error $\alpha$ over a predetermined period. A signal indicating the average error $\alpha'$ is provided to an ignition timing setter 52 which corresponds to the ignition timing setter 42 of FIG. 1 and operates in a similar manner except that it calculates the control period Ta for ignition based on the average error $\alpha'$ rather than on the instantaneous error $\alpha$. An output signal indicating the value of Ta is provided to an unillustrated ignition controller which controls the current of an unillustrated ignition coil.

The error calculating unit 53 includes an operating condition determiner 54 which receives input signals from the operating condition sensors 3 and determines whether the operating conditions D indicate a prescribed operating state, such as a steady engine rotational speed. When it determines that the engine rotational speed is steady, it generates an output signal H, and in response to this signal, an error calculator 55 calculates the error $\alpha$ in the reference position signal $T\theta$. The error calculator 55 corresponds to the error calculator 46 of FIG. 1 and calculates the error $\alpha$ in the same manner. An averager 56 then calculates a running average of the error $\alpha$ calculated by the error calculator 55 and generates an output signal indicating the average error $\alpha'$. This signal is provided to the ignition timing setter 52, along with a signal from the operating condition sensor 3 and a signal from the period calculator 51 indicating period T1.

Figure 6:
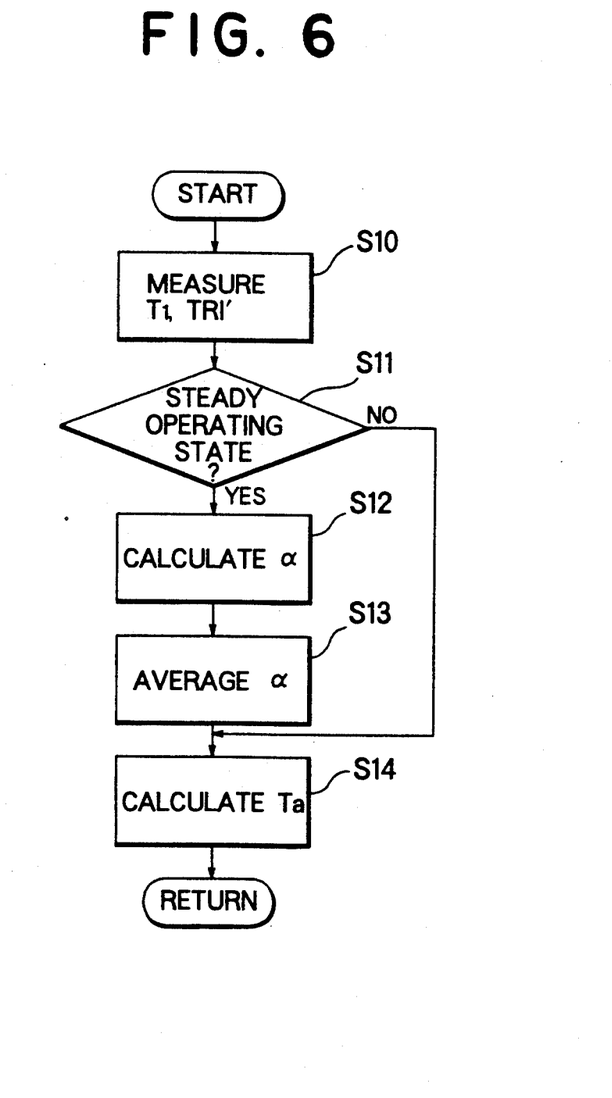
FIG. 6 is a flow chart illustrating the operation of the embodiment of FIG. 5.

The operation of the embodiment of FIG. 5 will be explained while referring to FIG. 6, which is a flow chart of a routine which can be performed by the microcomputer 5, and with respect to FIGS. 2 and 3, which show the reference position signal $T\theta$ and the ignition coil current during operation of this embodiment.

The reference position signal $T\theta$ is input to the microcomputer 5 through the interface 2, and in Step S10 the period calculator 51 calculates period T1 and the reference position separation TRI. The reference position separation TRI includes an error $\alpha$. Period T1 can be determined by measuring the time between consecutive rising edges of the reference position signal $T\theta$, corresponding to the occurrence of the first reference position $\theta R$ in two different cylinders. Alternatively, the time between occurrence of the first reference position $\theta R$ for a single cylinder (corresponding to 720° of crankshaft rotation) can be measured and the measured time divided by 4 to obtain T1. In addition, several measurements of T1 can be averaged for greater accuracy.

In Step S11, the operating condition determiner 54 determines whether the engine operating state is a prescribed operating state in which the engine rotational speed is steady. If it is, then the operating condition determiner 54 generates an output signal H. An example of a steady operating state is one in which the engine rotational speed is less than or equal to 2000 rpm. In this case, the operating conditions D include the engine rotational speed.

If the engine operating state is steady, then in Step S12, the error calculator 55 calculates the calculates the error $\alpha$ from Equation (1) or Equation (4) given above. In Step S13, the averager 56 calculates a running average of the error $\alpha$ calculated in Step S12 and provides the average error $\alpha'$ to the ignition timing setter 52. Any method which can form an average of the error $\alpha$ over a plurality of passes through the routine of FIG. 6 can be used. For example, the average error $\alpha'$ can be calculated from the formula $$\alpha' = (\alpha_{n-1} + \alpha_n)/2 \qquad (9)$$

wherein $\alpha_n$ is the error calculated in Step S12 during the current pass through the routine, and $\alpha_{n-1}$ is the error calculated during the preceding pass through the routine for the same cylinder. As the error can vary from cylinder to cylinder, preferably the average error $\alpha'$ is calculated individually for each cylinder. Instead of averaging two values of the error α as in Equation (9), it is possible to average a larger number, such as three or more values.

A signal indicating the calculated average error α' is input to the ignition timing setter 52, which in Step S14 calculates the ignition timing θA based on the operating conditions D and period T1, and then it calculates the control period Ta so as to compensate for the error α in the reference position signal Tθ.

In the case illustrated in FIG. 2 in which the error α in the reference position signal Tθ is assumed to be with respect to the first reference position θR, when the ignition timing θA is prior to the second reference position θI, the control period Ta will be a period Ta1 measured from the first reference position θR. Therefore, the control period Ta1 is calculated by the following equation:

$$Ta1 = (\theta R + \alpha' - \theta A) \cdot T1/180° \quad (10)$$

This equation is identical to Equation (2) except that α in Equation (2) has been replaced by α'. Thus, $(\theta R - \theta A) \cdot T1/180°$ is the value of Ta1 in the absence of an error α in the reference position signal Tθ, and $\alpha' \cdot T1/180°$ is a correction factor to compensate for the error α.

At a low engine speed at which the ignition timing θA is later than the second reference position θI, the control period Ta will be a period Ta2 which is measured from the second reference position θI rather than from the first reference position θR. As the falling edge of the reference position signal θI is assumed to accurately indicate the second reference position θI, it is not necessary to correct the control period Ta2 for the error α. Therefore, the control period Ta2 is calculated using Equation (6).

In the case shown in FIG. 3 in which the error α in the reference position signal Tθ is assumed to be with respect to the second reference position θI, when the ignition timing θA is later than the second reference position θI, the control period Ta will be a period Ta2 measured from the second reference position θI. Therefore, the control period Ta2 is calculated by the following equation:

$$Ta2 = (\theta R - 70° - \alpha' - \theta A) \cdot T1/180° \quad (11)$$
$$= (\theta I - \alpha' - \theta A) \cdot T1/180°$$

This equation is identical to Equation (7) except that α has been replaced by α'. $(\theta I - \theta A) \cdot T1/180°$ is the value of Ta2 in the absence of an error α in the reference position signal Tθ, and the term $\alpha' \cdot T1/180°$ is a correction factor which compensates for the existence of the error α. At a high engine speed at which the ignition timing θA is earlier than the second reference position θI, the control period will be a period Ta1 measured from the first reference position θR rather than from the second reference position θI. As the rising edge of the reference position signal θT is assumed to accurately indicate the first reference position θR, even if the reference position signal Tθ contains an error with respect to the second reference position θI, it is not necessary to correct the control period Ta1 for the error α. Therefore, the control period Ta1 will be calculated using Equation (8).

In Step S11, if it is determined that the engine operating state is not steady, such as when the engine rotational speed is greater than 2000 rpm, the routine proceeds to Step S14, and the control period Ta is calculated either by assuming that the error α is zero or by using the error α determined in a previous pass through the routine when the engine rotational speed was steady. As a result, when the engine rotational speed is unsteady, an error α of low reliability is not calculated.

As in the first embodiment, the calculation of the control period Ta takes into consideration the presence of an error α in the reference position signal Tθ. Therefore, ignition will take place at the correct crankshaft angle corresponding to the calculated ignition timing θA. As a result, problems such as knocking due to an excessive advance angle or lag angle can be prevented, and the engine power can be maximized.

As discussed with respect to the first embodiment, the microcomputer 5 can be adapted to calculate a different control period for the engine, such as the fuel injection timing. In this case as well, the calculated control period will compensate for the error α in the reference position signal Tθ.

In the embodiments of FIGS. 1 and 5, there may be instances in which the absolute value of the error α or average error α' calculated by the error calculating unit 43 or 53 may be too large, and if the control period Ta is calculated based on this value, and the control period Ta will be improper. Therefore, the error calculating unit 43 or 53 may be modified so that the calculated error α or average error α' is maintained to within a predetermined allowable range having an upper limit (such as ±2°) and a lower limit (such as −2°). For example, in the embodiment of FIG. 1, if the value of α calculated by the error calculator 46 using Equation (1) is greater than 2°, the error calculating unit 43 can be made to automatically clip the error α to the upper limit of 2° and provide the ignition timing setter 42 with a signal indicating an error of 2°. If the value of α calculated by Equation (1) is less than −2°, the error calculating unit 43 can be made to automatically clip the error α to the lower limit of −2°. Thus, the error α supplied to the ignition timing setter 42 can be maintained within the allowable range of ±2°.

Similarly, in the embodiment of FIG. 5, the error calculating unit 53 can be made to automatically clip the average error α' calculated by the averager 56 so as to be within an allowable range, such as ±2°. In this manner, excessive correction of the control period can be prevented.

What is claimed is:

1. A control apparatus for an internal combustion having one or more cylinders each having a piston, comprising:

reference position sensing means for generating a reference position signal for indicating occurrence of a first and a second reference position of a piston of the engine;

period determining means responsive to the reference position signal for measuring a period between two indications by the reference position signal of an occurrence of one of the references positions and for measuring a reference position separation between an indication by the reference position signal of an occurrence of the first reference position and an indication by the reference position signal of an occurrence of the second reference position;

error calculating means for calculating an error in the reference position signal with respect to the first or the second reference position based on a ratio of the reference position separation to the period measured by the period determining means; and timing setting means for calculating a control timing indicating a piston position at which a control operation for the engine is to take place, and for calculating a control period corresponding to the length of time from an indication by the reference position signal of an occurrence of one of the reference positions until an occurrence of the control timing based on the calculated error.

2. A control apparatus as claimed in claim 1 wherein the reference position signal has a first change in level to indicate an occurrence of the first reference position and a second change in level to indicate an occurrence of the second reference position.

3. A control apparatus as claimed in claim 1 wherein the control period equals a length of time for a piston of the engine to move from one of the reference positions to the control timing adjusted for a length of time corresponding to the error.

4. A control apparatus as claimed in claim 1 further comprising operating condition determining means for determining when a prescribed operating condition of the engine exists, wherein the error calculating means calculates the error only when the operating condition determining mean determines that the prescribed operating condition exists.

5. A control apparatus as claimed in claimed in claim 4 wherein the operating condition determining means determines that the prescribed operating condition exists when the rotational speed of the engine rotational is below a prescribed value.

6. A control apparatus as claimed in claim 4 wherein:
the period determining means includes means for measuring a first period between two occurrences of the first reference position and a second period between two occurrences of the second reference position; and
the operating condition determining means determines that the prescribed operating condition exists when a difference between the first and second periods is below a prescribed value.

7. A control apparatus as claimed in claim 1 wherein the error calculating means comprises means for calculating a first error for a single cylinder of the engine and averaging the first error to obtain an average error, and the timing setting means sets the control period based on the average error.

8. A control apparatus as claimed in claim 1 wherein the error calculating means comprises means for calculating a first error, means for comparing the first error with a range having a limit, and means for setting a second error equal to the limit when the first error is outside the range, wherein the timing setting means sets the control period based on the second error when the first error is outside the range.

9. A control apparatus as claimed in claim 8 wherein the range has an upper limit and a lower limit and the error calculating means sets the second error equal to the upper limit when the first error is greater than the upper limit and sets the second error equal to the lower limit when the first error is smaller than the lower limit.

10. A control apparatus as claimed in claim 1 wherein the control timing is an ignition timing indicating a piston position at which ignition is to take place in the engine.

11. A control apparatus as claimed in claim 1 wherein the control timing is a fuel injection timing indicating a piston position at which fuel injection is to take place in the engine.

12. A control apparatus for an internal combustion having one or more cylinders each having a piston, comprising:
reference position sensing means for generating a reference position signal comprising a plurality of pulses, each pulse having a rising edge indicating a first reference position of a piston of the engine and a falling edge indicating a second reference position of a piston of the engine;
period determining means responsive to the reference position sensing means for measuring a first period between occurrences of two rising edges of the reference position signal and a second period between occurrences of two falling edges of the reference position signal a reference position separation equal to a pulse width of one of the pulses of the reference position signal;
operating condition determining means for determining when the engine is in a steady operating condition;
error calculating means for calculating an error equal to a deviation in the rising or falling edge of one of the pulses with respect to the first or the second reference position, respectively, based on a ratio of the reference position separation and the first or the second period when the operating condition determining means determines that the engine operating condition is steady;
means for calculating an ignition timing indicating a piston position at which ignition is to take place in the engine; and
means for calculating a control period equal to a length of time from an occurrence of a rising or falling edge of one of the pulses until an occurrence of the ignition timing based on the calculated error.

13. A control method for an internal combustion engine having one or more cylinders each having a piston, comprising:
generating a reference position signal for indicating occurrence of a first and a second reference position of a piston of the engine;
measuring a period between two indications by the reference position signal of an occurrence of one of the references positions and a reference position separation between an indication by the reference position signal of an occurrence of the first reference position and an indication by the reference position signal of an occurrence of the second reference position;
calculating an error in the reference position signal with respect to the first or the second reference position based on a ratio of the reference position separation to the period measured by the period determining means;
calculating a control timing indicating a piston position at which a control operation for the engine is to take place; and
calculating a control period corresponding to the length of time from an indication by the reference position signal of an occurrence of one of the reference positions until an occurrence of the control timing based on the calculated error.

14. A method as claimed in claim 13 including determining when the engine is in a steady operating state, wherein the error is calculated error only when it is determined that the engine is in a steady operating state.

15. A method as claimed in claim 13 wherein calculating the error comprises calculating a first error for a single cylinder of the engine and averaging the first error to obtain an average error, wherein the control period is calculated using the average error.

16. A method as claimed in claim 13 wherein calculating the error comprises calculating a first error, comparing the first error with a range having a limit, and calculating a second error equal to the limit when the first error is outside the range, wherein the control period is calculated using the second error.

17. A method as claimed in claim 16 wherein the range has an upper limit and a lower limit, and the second error is equal to the upper limit when the first error is greater than the upper limit and is equal to the lower limit when the first error is less than the lower limit.

* * * * *